US008561863B2

(12) United States Patent
LaColla et al.

(10) Patent No.: US 8,561,863 B2
(45) Date of Patent: Oct. 22, 2013

(54) UNIVERSAL ELECTRONIC DEVICE HOLDER ATTACHABLE TO HEADREST BARS

(75) Inventors: Charlie LaColla, Woodland Hills, CA (US); Shraddha Patel, Walnut, CA (US); Mervyn Cheung, Alhambra, CA (US); Soo Youn Kim, Tustin, CA (US)

(73) Assignee: Superior Communications, Inc., Irwindale, CA (US)

( * ) Notice: Subject to any disclaimer, the term of this patent is extended or adjusted under 35 U.S.C. 154(b) by 194 days.

(21) Appl. No.: 13/157,259

(22) Filed: Jun. 9, 2011

(65) Prior Publication Data
US 2012/0312847 A1 Dec. 13, 2012

(51) Int. Cl.
*B60R 7/00* (2006.01)
*B60R 11/00* (2006.01)

(52) U.S. Cl.
USPC ........... 224/275; 224/545; 224/548; 224/552; 224/554; 224/555

(58) Field of Classification Search
USPC ......... 224/201, 275, 407, 420, 421, 545, 548, 224/552, 553, 555, 558, 567, 570, 929, 224/930; 248/448, 451, 447.1, 288.31, 248/181.1, 181.2, 176.1, 187.1, 126, 248/917–923, 214; 403/120, 304, 321, 403/322.1, 325

See application file for complete search history.

(56) References Cited

U.S. PATENT DOCUMENTS

| | | | | |
|---|---|---|---|---|
| 5,370,060 A | * | 12/1994 | Wang | 108/44 |
| 6,966,533 B1 | * | 11/2005 | Kalis et al. | 248/316.4 |
| 7,526,843 B2 | * | 5/2009 | Lin | 24/600.4 |
| 2009/0038515 A1 | * | 2/2009 | Robinson | 108/44 |
| 2009/0230161 A1 | * | 9/2009 | Emsky | 224/257 |
| 2010/0264182 A1 | * | 10/2010 | Perlman et al. | 224/409 |
| 2011/0006091 A1 | * | 1/2011 | Schafer | 224/282 |
| 2012/0018471 A1 | * | 1/2012 | Guillermo et al. | 224/275 |

* cited by examiner

*Primary Examiner* — Adam Waggenspack
(74) *Attorney, Agent, or Firm* — Snell & Wilmer LLP

(57) ABSTRACT

Devices, methods and systems described herein provide for removably attaching an electronic device holder to a set of headrest bars of a seat in a vehicle in a manner which allows the user, while seated in the backseat of the vehicle, to utilize the electronic device without holding the electronic device.

20 Claims, 10 Drawing Sheets

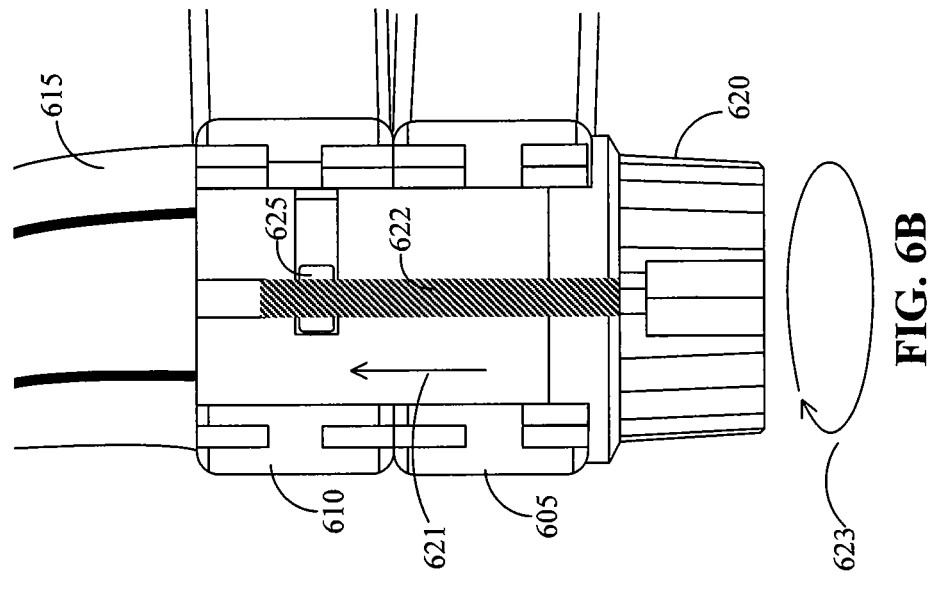
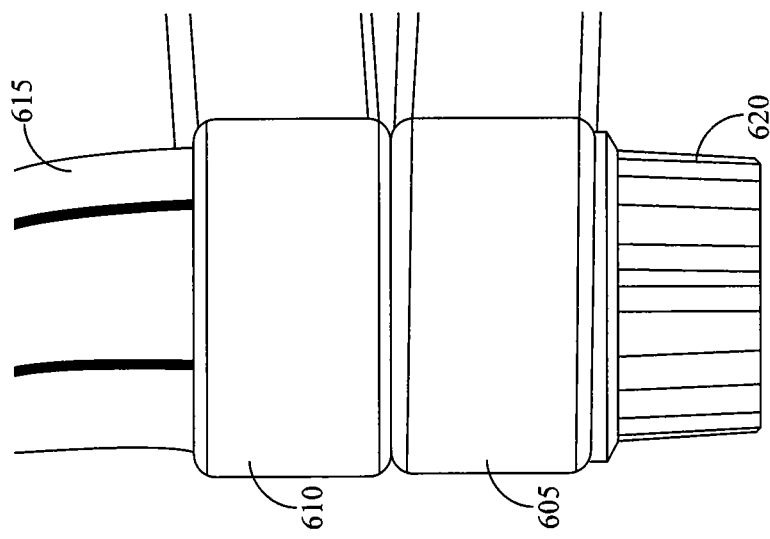
FIG. 6B
FIG. 6A

UNIVERSAL ELECTRONIC DEVICE HOLDER ATTACHABLE TO HEADREST BARS

BACKGROUND

1. Field

The present invention relates to an apparatus, method and/or system for attaching an electronic device holder to a set of headrest bars of a headrest of a seat in a vehicle.

2. Description of Related Art

With portable electronic devices such as cellular phones, portable tablet computers and the like gaining widespread popularity, users desire improved apparatus and methods for utilizing these portable electronic devices on-the-go. For example, a backseat passenger in a vehicle may desire to prop or secure the electronic device in a manner to allow the passenger to utilize the electronic device with both hands. This may be especially true for larger electronic devices which include many applications or programs that may be most effectively used with both hands such as word processing applications, video game applications and the like.

However, with the proliferation of these portable electronic devices, many users have multiple devices and/or are constantly obtaining new devices. Even in the current market, there is no uniformity in the size of the portable electronic device. Accordingly, a holder geared towards one particular sized portable electronic device may be quickly outdated.

Another problem is that vehicles lack uniformity. For example, each brand of vehicle, and even each model within that brand may have different configurations and sizing of parts. For instance, many vehicles may include an adjustable headrest cushion attached to a seat via a pair of parallel bars. However, the size (diameter) of the bars may differ from vehicle to vehicle. Accordingly, a holder that may support only one common size of bars may also be quickly outdated.

Furthermore, certain holders are cumbersome to install and may require the entire headrest to be removed as part of the installation process. Many users desire convenience and prefer holders that can be easily attached and removed.

What is needed is an electronic device holder that may solve one or more of the above problems—namely, a universal electronic device holder which may support devices of different sizes, be attachable to a number of vehicle headset attachment bars of different diameters, and/or be easily attachable and removable without having to remove and insert the headset each time.

SUMMARY

Devices, methods and systems described herein provide for removably attaching an electronic device holder to a set of headrest bars of a seat in a vehicle in a manner which allows the user, while seated in the backseat of the vehicle, to utilize the electronic device without holding the electronic device.

In one embodiment, the present invention may be an apparatus for securely holding an electronic device while the apparatus is attached to one or more headrest bars of a seat in a vehicle in a manner which allows the user to utilize the electronic device without holding the electronic device, the apparatus comprising: a pair of attachment arms configured to removably attach to the one or more headrest bars of the seat in the vehicle; a neck attached to each of the attachment arms at a first end, the neck having a ball-shaped surface at a second end; a back support pivotably attached to the neck at the second end, the back support for contacting a non-screen side of the electronic device; a top supporting member adjustably attached to a first side of the back support, the top supporting member for pressing against a top edge of the electronic device; and a bottom supporting member adjustably attached to a second side of the back support opposite the first side, the bottom supporting member for pressing against a bottom edge of the electronic device.

In another embodiment, the present invention may be an apparatus for securely holding an electronic device while the apparatus is attached to one or more headrest bars of a seat in a vehicle in a manner which allows the user to utilize the electronic device without holding the electronic device, the apparatus comprising: a pair of attachment arms configured to removably attach to the one or more headrest bars of the seat in the vehicle; a neck attached to each of the attachment arms at a first end, the neck having a ball-shaped surface at a second end; a back support pivotably attached to the neck at the second end, the back support having an adhesive portion for contacting a non-screen side of the electronic device to hold the electronic device to the back support; a top supporting member adjustably attached to a first side of the back support, the top supporting member for pressing against a top edge of the electronic device; and a bottom supporting member adjustably attached to a second side of the back support opposite the first side, the bottom supporting member for pressing against a bottom edge of the electronic device.

In yet another embodiment, an apparatus for securely holding an electronic device while the apparatus is attached to one or more headrest bars of a seat in a vehicle in a manner which allows the user to utilize the electronic device without holding the electronic device, the apparatus comprising: a pair of attachment arms configured to removably attach to the one or more headrest bars of the seat in the vehicle; a neck attached to each of the attachment arms at a first end, the neck having a ball-shaped surface at a second end; a back support pivotably attached to the neck at the second end; and an adhesive portion attached to the back support for contacting a non-screen side of the electronic device to hold the electronic device to the back support.

BRIEF DESCRIPTION OF THE DRAWINGS

The features, obstacles, and advantages of the present invention will become more apparent from the detailed description set forth below when taken in conjunction with the drawings, wherein:

FIG. 6A illustrates a close-up view of the attachment arm locking mechanism according to one embodiment of the present invention.

FIG. 6B illustrates a cross-sectional view of the attachment arm locking mechanism of FIG. 6A according to one embodiment of the present invention.

DETAILED DESCRIPTION

Apparatus, systems and/or methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
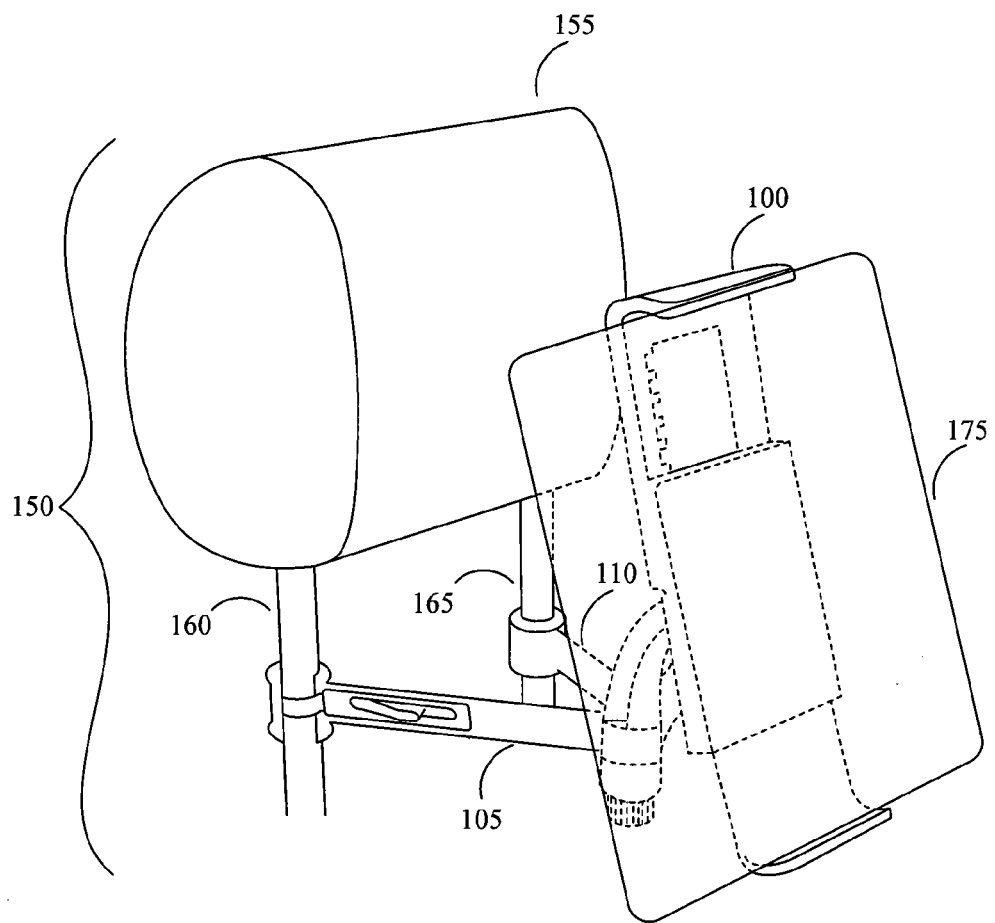
FIG. 1 illustrates a perspective view of the electronic device holder holding the electronic device while being removably attached to the headrest bars of a seat in a vehicle according to one embodiment of the present invention.

FIG. 1 illustrates a portion of a vehicle interior. In one embodiment, the present invention may be an electronic device holder 100 usable inside a vehicle such as a car. More particularly, FIG. 1 illustrates a front view of the holder 100 holding an electronic device 175 while being attached to a headrest apparatus 150. As shown, the holder 100 may include attachment arms 105 and 110 for attaching the holder 100 to bars 160 and 165 of the headrest apparatus 150 located below a headrest cushion 155. In this manner, a user sitting in the backseat of the vehicle may utilize the electronic device 175 with both hands without holding the electronic device 175.

Figure 2A:
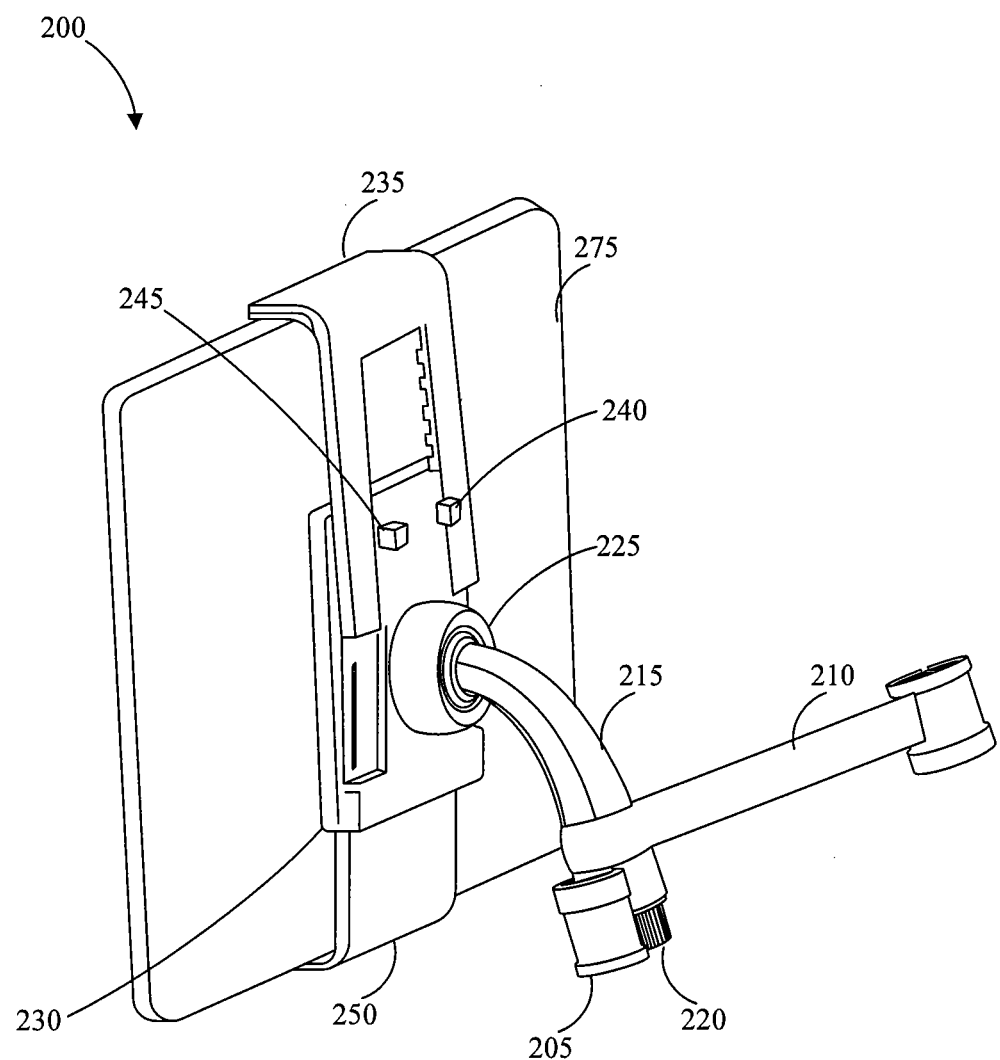
FIG. 2A illustrates a rear-side perspective view of the electronic device holder holding the electronic device according to one embodiment of the present invention.
Figure 2B:
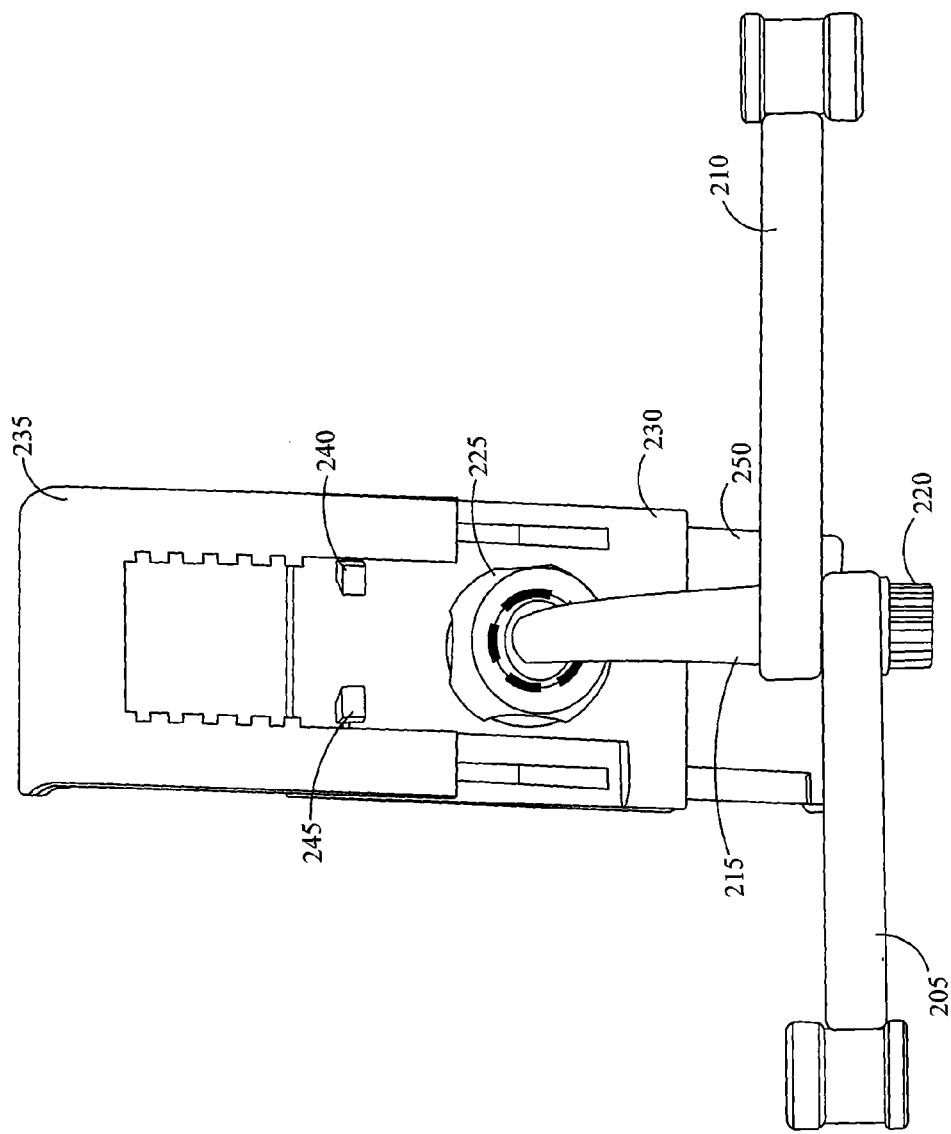
FIG. 2B illustrates a rear perspective view of the electronic device holder according to one embodiment of the present invention.

FIG. 2A illustrates an electronic device holder 200 with an electronic device 275 securely held in place. While the holder 200 may be the holder 100 of FIG. 1, certain portions of the vehicle interior have been omitted for clarity. As shown, the holder 200 may include a first attachment arm 205 and a second attachment arm 210 for attaching the holder 200 to a pair of headrest bars (e.g., the bars 160 and 165 of FIG. 1). The holder 200 may also include a neck 215 for connection to the attachment arms 205 and 210. On one end of the neck 215, proximal to the attachment arms 205 and 210, may be a locking mechanism 220 for tightening and securing the attachment arms 205 and 210 in place once the attachment arms 205 and 210 are correctly positioned (e.g., as secured to the headrest bars). The other end of the neck 215, distal to the attachment arms 205 and 210, may be attached to the back support 230. As shown, the neck 215 may be curved and, in one embodiment, may decrease in girth moving from the proximal end to the distal end. More particularly, the neck 215 may include a ball joint 225 at the distal end. The ball joint 225 may be attached to a back support 230, and may allow the back support 230 to pivotably adjust to a number of different positions while the position of the attachment arms 205 and 210 are still fixed. The ball joint 225 may include a dedicated locking mechanism which allows the user to fix the position of the back support 230 once the user has adjusted the back support 230 to the desired angle. The back support 230 may press against the back surface of the electronic device 275 and assist to keep the electronic device 275 held firmly in place. The back support 230 may be coupled to a top supporting member 235 which may be adjustable vertically via adjusting members 240 and 245. The back support 230 may also be coupled to a bottom supporting member 250 which may be adjustable vertically. By adjusting the top supporting member 235 and the bottom supporting member 250, the holder 200 may be configured to be functional with a number of different electronic devices having different lengths and widths. In this manner, the holder 200 may be considered a universal holder for holding electronic devices of different sizes. FIG. 2B illustrates a rear perspective view of the electronic device holder 200, with the electronic device 270 omitted for clarity.

Figure 3:
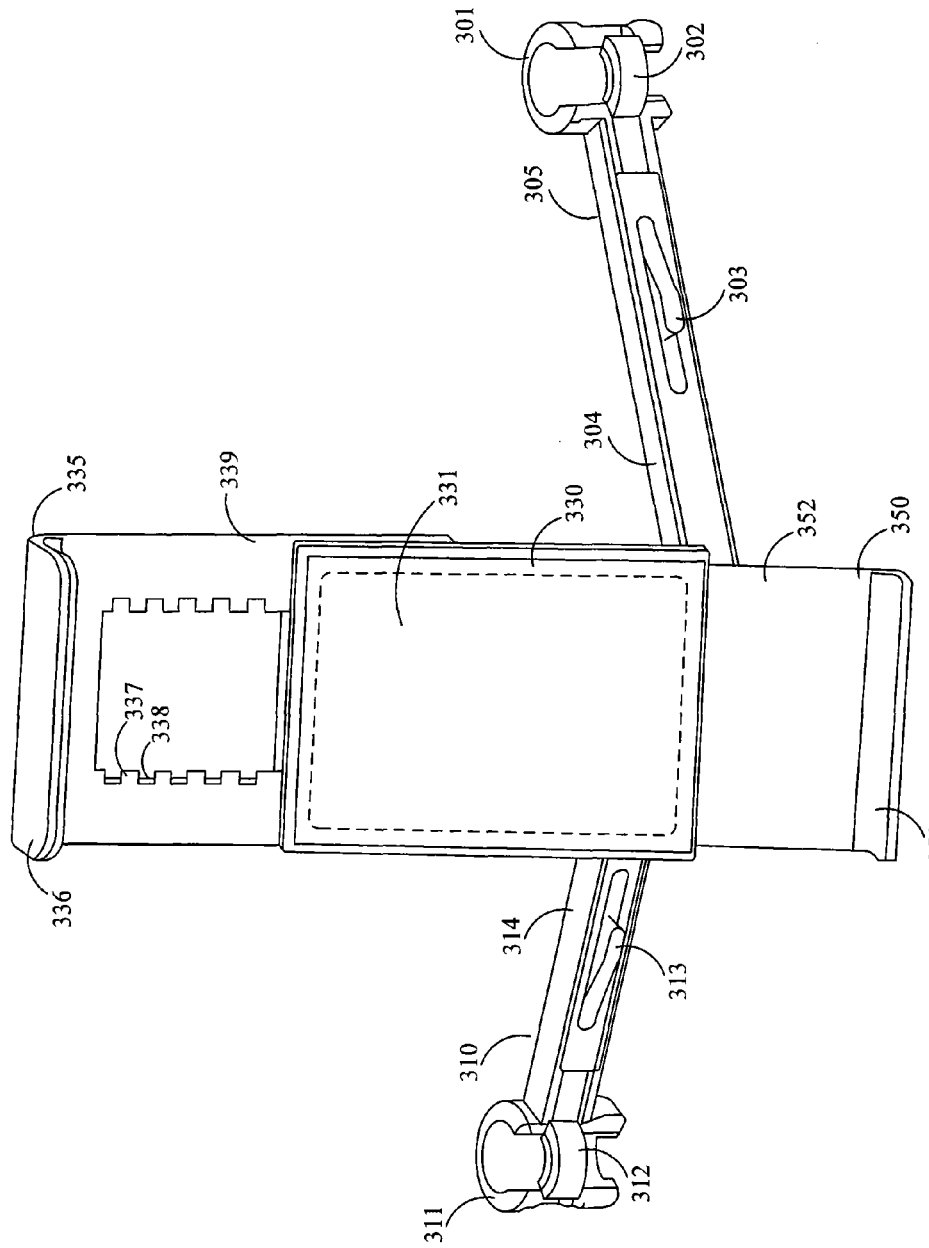
FIG. 3 illustrates a front view of the electronic device holder according to one embodiment of the present invention.

FIG. 3 illustrates an electronic device holder 300. In one embodiment, the holder 300 may be the electronic device holder 200 of FIG. 2 illustrated with the electronic device 270 omitted for clarity. As shown, the holder 300 may include a first attachment arm 305. The first attachment arm 305 may have a curved receiver 301 and a claw 302. The claw 302 may be manipulated and moved by a control tab 303. The curved receiver 301 may be integrated into a housing 304 of the first attachment arm 305 and may be stationary with respect to the movable claw 302. When the control tab 303 is pulled back, the claw 302 may move in an analogous direction, thereby creating an opening that allows the curved receiver 301 to receive a headrest bar. Once the headrest bar is in position (e.g., contacting the inner surface of the curved receiver 301), the user may release the control tab 303, which may cause the claw 302 to return to its original position in contact with the curved receiver 301. Accordingly, the return of the claw 302 to its original position may close the created opening, thereby locking the headrest bar in position. In other words, the curved receiver 301 and the claw 302 may form a continuous or semi-continuous circumferential barrier about an exterior surface of the headrest bar.

A second attachment arm 310 may include a curved receiver 311, a claw 312, a control tab 313 and a housing 314 corresponding to the curved receiver 301, the claw 302, the control tab 303 and the housing 304 of the first attachment arm 305, respectively. In one embodiment, the second attachment arm 310 may be configured to attach to the same or different bar as attachment arm 305. Such configurations may be desirable where the vehicle is a public bus and the user desires to attach the portable electronic device to a hand bar of the bus.

The holder 300 as shown may also include a back support 330 having an adhesive member 331. The adhesive member 331 may be optionally added to further secure the electronic device (not shown) to the holder 300. Details of the adhesive member 331 are further described herein with respect to FIG. 4. Turning back to FIG. 3, the holder 300 may include a top supporting member 335 and a bottom supporting member 350, both of which are adjustable. The top supporting member 335 may include a pressing component 336 and a sliding member 339. The sliding member 339 may define therein a plurality of teeth 337 and grooves 338. The pressing component 336 may be adjusted to press on the top of the electronic device (not shown), while the teeth 337 and grooves 338 of the sliding member 339 may be positionally adjusted to hold the pressing component 336 in place as more fully discussed with respect to FIG. 8. The bottom supporting member 350 may include a spring-controlled body 352 attached to a pressing component 351. Here, the pressing component 351 may be adjusted to press on the bottom of the electronic device (not shown) as further discussed with respect to FIG. 7. Accordingly, when positioned correctly, the pressing component 336 of the top supporting member 335 and the pressing component 351 of the bottom supporting member 350 may simultaneously exert compression forces on the electronic device to hold the electronic device in place.

The general structure of certain embodiments of the present invention having been described, attention will now be turned to specific details corresponding to one or more described embodiments.

Figure 4:
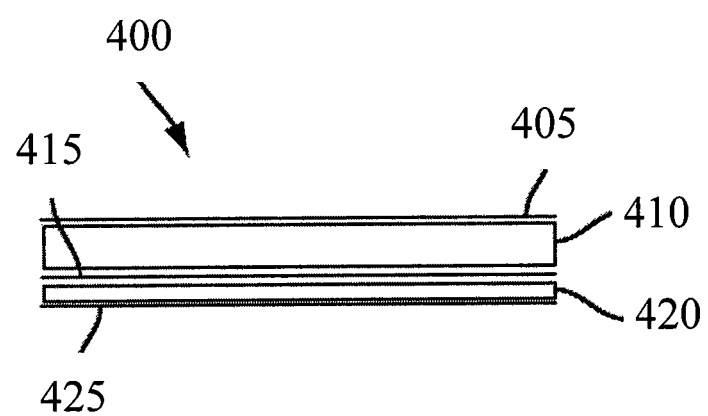
FIG. 4 illustrates the layers of the adhesive member according to one embodiment of the present invention.

FIG. 4 is a cross-sectional view of an adhesive member 400. In one embodiment, the adhesive member 400 may have an overall thickness of between about 0.1 mm and about 3 mm. The adhesive member 400 may include a plurality of layers. For example, the adhesive member 400 may have a first removable layer 405, which may be removed immediately prior to the first time the adhesive member 400 is to be attached or adhered to an electronic device (e.g., the electronic device 275). The first removable layer 405 may be a thin polyester or polyethylene terephthalate (PET) film and may initially contact and fully cover a surface of an electronic device attachment (EDA) layer 410 to keep the surface of the EDA layer 410 clean and debris-free before the surface of the EDA layer 410 is brought into contact and attached to the electronic device (e.g., the electronic device 275). The EDA layer 410 may be constructed out of a polyurethane (PU) elastomer, such as a plastic, silicone or rubber, and may exhibit strong adhesive qualities when in contact with a surface of another object (e.g., the electronic device 275) while allowing for easy removal when a force is applied to separate the EDA layer 410 and the surface of the other object, and without damaging the surface of the other object. Moreover, when the PU elastomer is reapplied to the surface of another object, it may retain most, if not all, of its original adhesive qualities. In other words, the material of the PU elastomer is designed to repeatedly provide strong adhesiveness but remain susceptible to a separation force exerted by a user.

One benefit to using a PU elastomer with these characteristics is that a user may remove and attach the electronic device (e.g., the electronic device 275) from the holder (e.g., the holder 200 or 300) as desired, thereby improving the overall ability of the holder to secure the electronic device. The EDA layer 410 may be permanently or semi-permanently attached on another side to a thin layer of PET film 415, which acts to separate the EDA layer 410 from an acrylic layer 420. The acrylic layer 420 may function to permanently or semi-permanently attach the adhesive member 400 to the back support (e.g., the back support 330). In this manner, when the user attempts to separate the adhesive member 400 from the electronic device, the acrylic layer 420 may stay attached to the back support (e.g., the back support 330) while the EDA layer 410 is separated from the electronic device (e.g., the electronic device 275). In one embodiment, the acrylic layer 420 may be coated with an adhesive 425 (e.g., an acrylic adhesive or any other glue-like substance) to further strengthen the hold between the acrylic layer 420 and the back support (e.g., the back support 320).

Figure 5A:
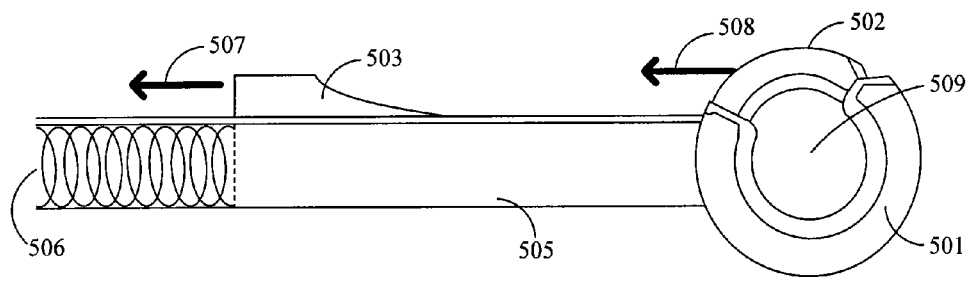
FIG. 5A illustrates a side of an attachment arm of the electronic device holder in a closed position according to one embodiment of the present invention.

FIG. 5A illustrates an operation of an attachment arm 505. In one embodiment, the attachment arm 505 may be the attachment arm 305 or 310 of FIG. 3. As shown in FIG. 5A, the attachment arm 505 may be considered to be in a closed position because an enclosure 509 may be formed by a claw 502 and a curved receiver 501. Even if the claw 502 and the curved receiver 501 do not contact each other to form an absolute enclosure, they substantially form an enclosure such that when a headrest bar or pole is inserted in the enclosure, the headrest bar or pole is secured and does not easily escape the enclosure unless a control tab 503 is manipulated. In operation, when the control tab 503 is pressed into a compression spring 506 as shown by arrow 507, the claw 502 may retract away from the curved receiver 501 in a direction shown by arrow 508, causing the enclosure 509 to be opened.

Figure 5B:
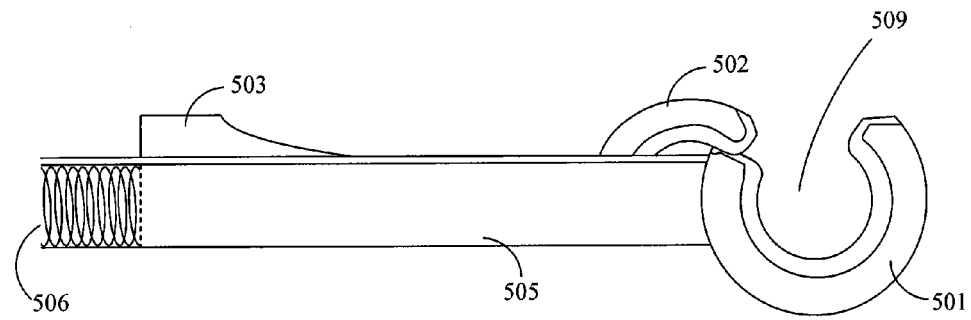
FIG. 5B illustrates a side view of the attachment arm of FIG. 5A of the electronic device holder in an open position according to one embodiment of the present invention.
Figure 5C:
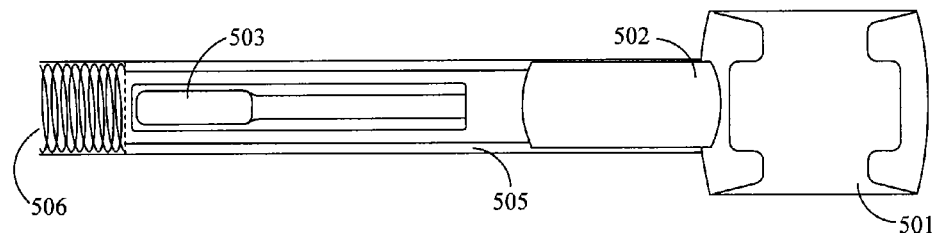
FIG. 5C illustrates a top view of the attachment arm of FIG. 5B of the electronic device holder in an open position according to one embodiment of the present invention.

FIG. 5B illustrates the attachment arm 505 in an open position with the claw 502 retracted from the curved receiver 501. In this position, the spring 506 is loaded. Upon release of the control tab 503, the spring 506 may uncoil and cause the claw 502 to revert back into the closed position shown in FIG. 5A. In this manner, the attachment arm 505 may be controlled by the user moving the control tab 503 along a fixed track to either open or close the enclosure 509, thereby allowing the attachment arm 505 to secure the headrest bar or pole in the closed position and allowing the attachment arm 505 to release from or receive the headrest bar or pole in the open position. In this manner, the attachment arm 505 may secure headrest bars or poles of different diameters. FIG. 5C illustrates another view of the attachment arm 505 in the open position with the claw 502 retracted from the curved receiver 501.

In addition to retracting the claw 502, the attachment arm 505 may be pivotably rotatable about the neck (e.g., the neck 215 of FIG. 2) to adjust for the position of the headrest bar or pole. FIG. 6A illustrates a close-up view of the attachment arm locking mechanism 620 according to one embodiment of the present invention which may be utilized to lock attachment arms 605 and 610 in place, once positioned by the user, about a neck 615.

FIG. 6B illustrates a cross-sectional view of the attachment arm locking mechanism of FIG. 6A. The user may turn the locking mechanism 620 in the direction as shown by arrow 623 to advance a screw 622 in the direction of arrow 621. As the screw 622 advances through a locking portion 625, the attachment arms 605 and 610 might not be able to pivot about the neck 615. Conversely, the user may turn the locking mechanism 620 in a reverse direction to retract the screw 622. As the screw disengages the locking portion 625, the attachment arms 605 and 610 may be able to pivot about the neck 615. It should be noted that by placing the locking mechanism 620 within the attachment arm located distally from the locking mechanism 620, both attachment arms 605 and 610 may be pivotably locked and unlocked together. Alternatively, each attachment arm 605 and 610 may include its own locking portion.

Figure 7B:
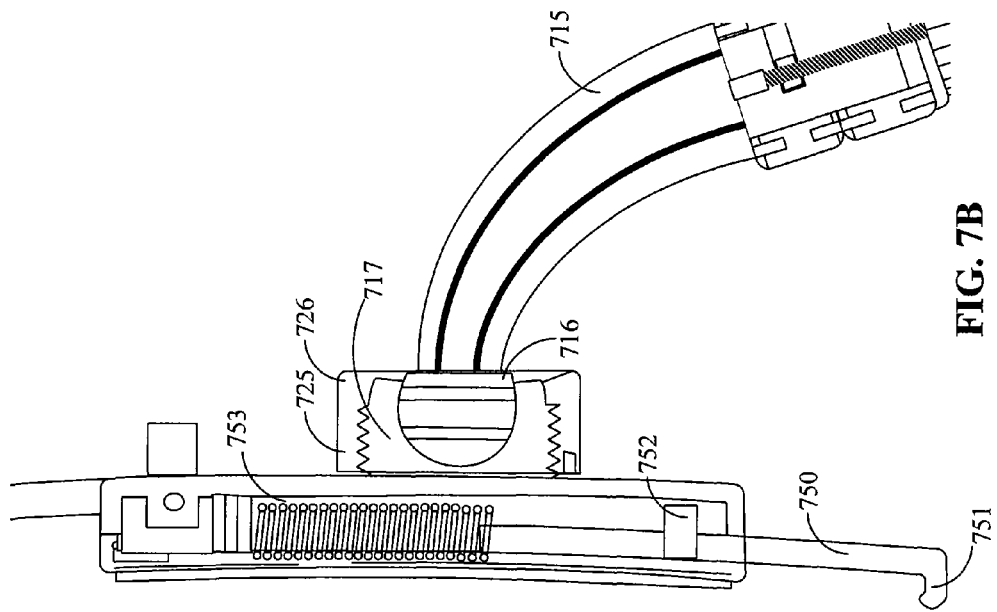
FIG. 7B illustrates a cross-sectional, side-view of the electronic device holder of FIG. 7A according to one embodiment of the present invention.
Figure 7A:
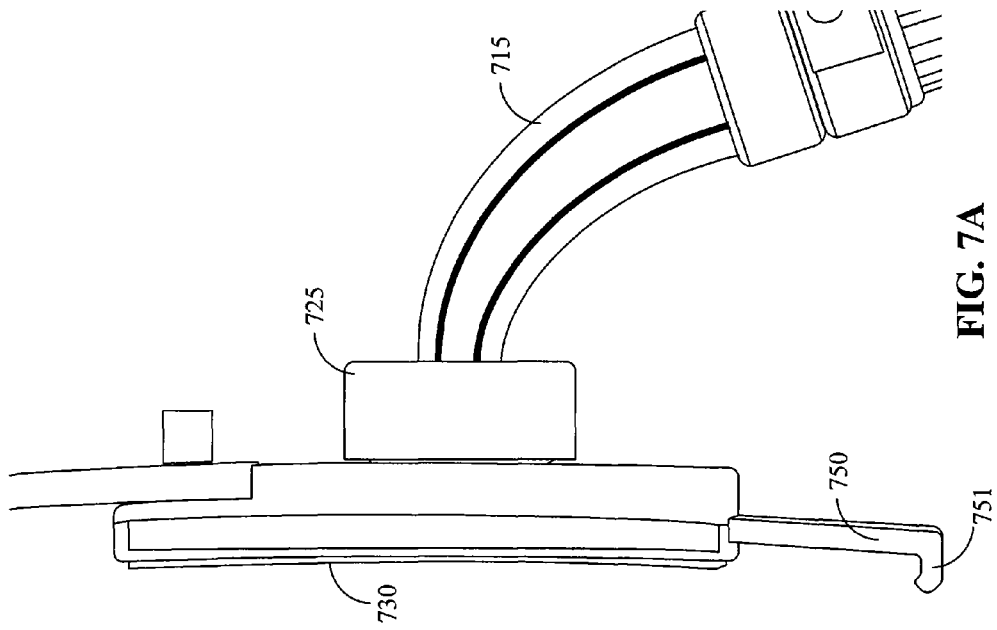
FIG. 7A illustrates a side view of the electronic device holder according to one embodiment of the present invention.

FIG. 7A illustrates a side view of an electronic device holder 700 including a ball joint 725 attaching a back support 730 and a neck 715. The electronic device holder 700 may further include a bottom supporting member 750.

FIG. 7B illustrates a cross section of the side view of the electronic device holder 700 of FIG. 7A. The ball joint 725 may include a ball-shaped surface 716 at the end of the neck 715, and a socket 717 attached to the back support 730. The ball-shaped surface 716 is capable of motion around a number of different axes which have one common center, thereby allowing the ball-shaped surface 716 to move in a 360° angle. The ball joint 725 may further include a tightening mechanism for locking the position and/or angle formed by the ball-shaped surface 716 and the socket 715 to enable the user to fix the position of the back surface upon completion of adjustment. The tightening mechanism may include a fastener 726 which may include threads (e.g., internal threads) for complementing external threads on the outer surface of the socket 715. As the fastener 726 is turned in a clockwise direction, the fastener 726 may lock the ball-shaped surface 716 in position. Conversely, when the fastener 726 is turned in a counter-clockwise direction, the fastener 726 may unlock the ball-shaped surface, thereby allowing the user to manipulate the angle prior to re-locking.

FIG. 7B further illustrates the functionality of the bottom supporting member 750. As shown, the bottom supporting member 750 may be attached to a tension spring 753. The spring 753 may be configured to operate with a tension load, so the spring 753 may stretch as the load is applied. In this manner, the electronic device (e.g., the electronic device 275) may be the applied load as it presses on a pressing component 751 of the bottom supporting member 750 and in this manner, the pressing component 751 of the bottom supporting member 750 may adjust to fit the electronic device. The pressing component 751 may be the curved portion of the bottom supporting member 750 that contacts and presses against a bottom edge of the electronic device. As the electronic device is removed, the spring 753 may re-coil and return to its natural state. The bottom supporting member 750 may further include a block 752 for contacting an inner bottom surface of the back support 730 to prevent the bottom supporting member 750 from further displacement away from the back support 730.

Figure 8:
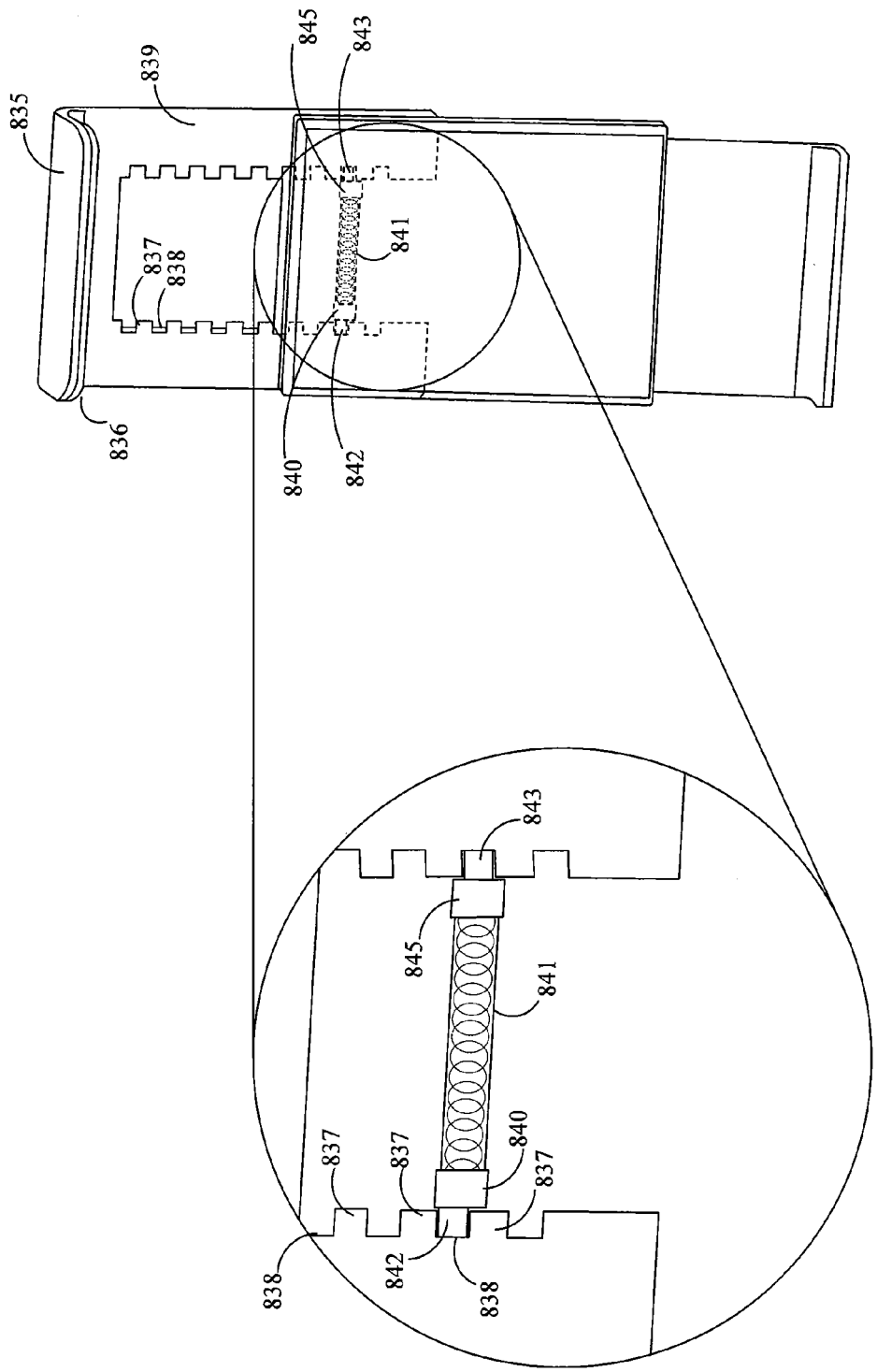
FIG. 8 illustrates a front view of the electronic device holder with a callout illustrating a spring mechanism for adjusting the top supporting member according to one embodiment of the present invention.

FIG. 8 illustrates a front view of the electronic device holder 800 with a callout illustrating a spring mechanism 841 for adjusting a pressing component 836 of a top supporting member 835. The pressing component 836 may be the curved portion of the top supporting member 835 that contacts and presses against a top edge of the electronic device. As shown, the electronic device 800 may include a sliding member 839 defining a plurality of alternating teeth 837 and grooves 838. The teeth 837 and grooves 838 may work in conjunction with the spring mechanism 841 to set the position of the top supporting member 835. For example, with one hand, the user may squeeze tabs 840 and 845 inwards (towards each other) to compress the spring mechanism 841. Once the spring mechanism 841 is compressed to the point where protrusions 842 and 843 are no longer locked into the grooves 838, the user may use his or her other hand to raise or lower the top supporting member 835. Once the user has positioned the top supporting member 835 at the desired height, the user may release the tabs 840 and 845, thereby allowing the protrusions 842 and 843 to slide into the corresponding grooves 838 at that particular height. The protrusions 842 and 843 are held into place within the grooves 838 by the adjacent teeth 837 and also by an outward force exerted by the spring mechanism 841. In this manner, the user may adjust the height of the top supporting member 835 to fit the size of the electronic device.

Figure 9:
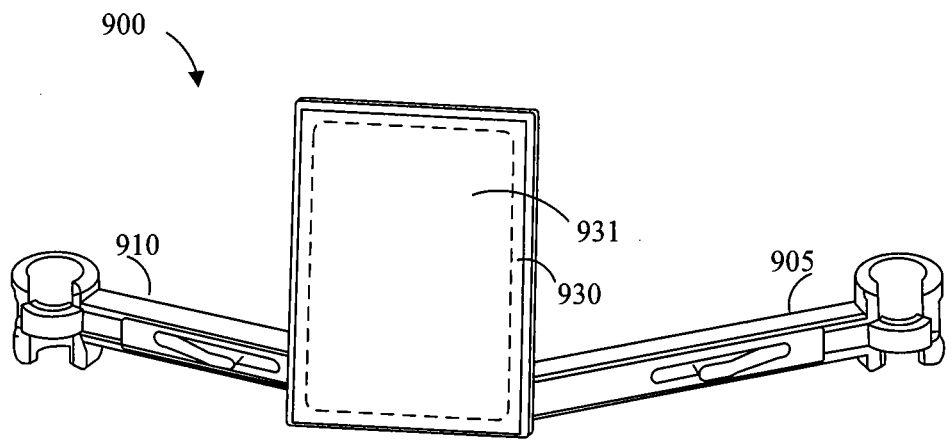
FIG. 9 illustrates a front view of the electronic device holder according to one embodiment of the present invention.

FIG. 9 illustrates an embodiment of an electronic device holder 900 which might not require a top or bottom supporting member (e.g., as compared to the top supporting member 235 and the bottom supporting member 250 of FIG. 2). In this implementation, the electronic device is removably attached to an adhesive member 931 located on a back support 930. The adhesive member 931 may be the adhesive member 400 as described above with respect to FIG. 4. In this embodiment as shown in FIG. 9, the adhesive member 931 is the sole mechanism for securing the electronic device to the electronic device holder 900. The electronic device holder 900 may also include attachment arms 905 and 910 for removably attaching the electronic device holder 900 to headrest bars of a seat in a vehicle.

Figure 10:
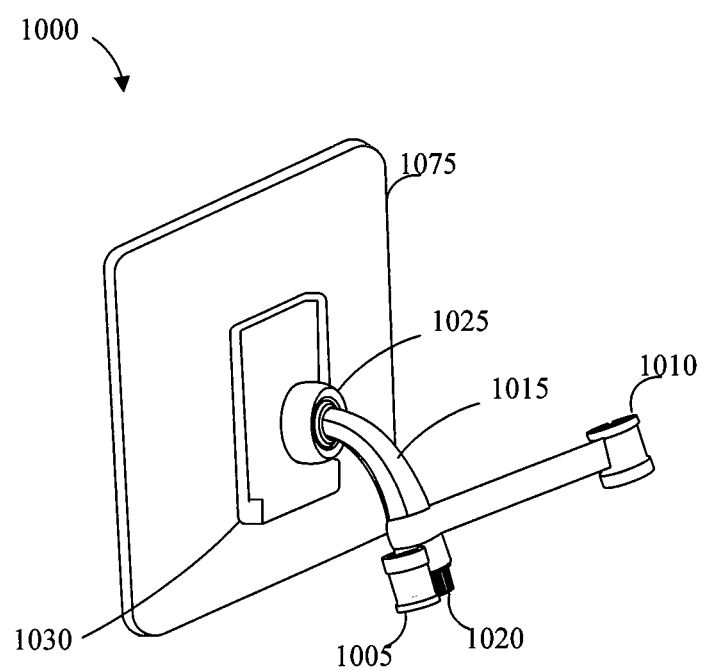
FIG. 10 illustrates a rear-side perspective view of the electronic device holder holding the electronic device according to one embodiment of the present invention.

FIG. 10 illustrates an electronic device holder 1000 as attached to an electronic device 1075. The holder 1000 may, in one embodiment, be the electronic device 900. The top and bottom supporting members are not included, and the electronic device 1075 is attached to a back surface 1030 via an adhesive member (not shown). The holder 1000 may include attachment arms 1005 and 1010 attached to a neck 1015. Two adjustment devices are also shown including an attachment arm locking mechanism 1020 and a ball joint 1025. The attachment arm locking mechanism 1020 may be the attachment arm locking mechanism 520 of FIGS. 6A and 6B, and as discussed above, may function to lock the position of the attachment arms 1005 and 1010 once the user has positioned them in place to correspond with the location and/or positioning of the vehicle's headrest bars. The ball joint 1025 may be utilized to adjust the angle of the back support 1030, thereby providing different viewing and usage angles for the electronic device 1075. Similarly, the ball joint 1025 may be locked into position once the user has manipulated the ball joint 1025 to a desired angle.

While not illustrated herein, many alternatives to the embodiments described above are possible. For example, a pair of side supporting members may be included on the back support functioning similar to the top and bottom supporting members 235 and 250 to provide the electronic device with even more support and security when held to the electronic device holder. In another implementation, one of the attachment arms may be configured to be removable. Having only one attachment arm might be useful in situations where the user is riding a bus or train and desires to attach the holder to a unitary bar of the bus or train. Alternatively, both attachment arms might be removable as may be desirable where the user is attempting to utilize the holder as a propping apparatus on a desk or table, not using it in the manner described herein for attaching to a moving vehicle.

Skilled artisans may implement the described functionality in varying ways for each particular application, but such implementation decisions should not be interpreted as causing a departure from the scope of the disclosed apparatus and/or methods.

The previous description of examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The elements and uses of the above-described embodiments can be rearranged and combined in manners other than specifically described above, with any and all permutations within the scope of invention. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. In addition, the invention is not limited to the illustrated embodiments, and all embodiments of the invention need not necessarily achieve all the advantages or purposes or possess all characteristics identified herein.

What is claimed is:

1. An apparatus for securely holding an electronic device while the apparatus is attached to one or more headrest bars of a seat in a vehicle in a manner which allows the user to utilize the electronic device without holding the electronic device, the apparatus comprising:

a first attachment arm having a first end and a second end, the first end configured to removably attach to the one or more headrest bars of the seat in the vehicle, the second end configured to pivot about an axis at the second end;

a second attachment arm having a first end and a second end, the first end of the second attachment arm configured to removably attach to the one or more headrest bars of the seat in the vehicle, the second end of the second attachment arm being pivotally attached to the second end of the first attachment arm and configured to pivot about the axis;

a neck having a first end and a second end, the first end of the neck attached to the second end of the first attachment arm and to the second end of the second attachment arm, the second end of the neck having a ball-shaped surface;

a back support pivotably attached to the second end of the neck, the back support for contacting a non-screen side of the electronic device;

a top supporting member adjustably attached to a first side of the back support such that the top supporting member may be slid relative to the back support towards and away from the back support, the top supporting member for pressing against a top edge of the electronic device; and a bottom supporting member adjustably attached to a second side of the back support opposite the first side such that the bottom supporting member may be slid relative to the back support towards and away from the top supporting member, the bottom supporting member for pressing against a bottom edge of the electronic device.

2. The apparatus of claim 1 wherein the back support includes a socket for receiving the ball-shaped surface of the neck, further wherein the socket holds the ball-shaped surface of the neck within the socket while allowing the ball-shaped surface of the neck to pivotably adjust to any of a plurality of angles.

3. The apparatus of claim 2 wherein the back support further includes a pair of tabs for adjusting the top supporting member.

4. The apparatus of claim 3 wherein the top supporting member includes a first set of teeth defining a first set of grooves therebetween and a corresponding second set of teeth defining a second set of grooves therebetween.

5. The apparatus of claim 4 wherein corresponding grooves are configured to receive protrusions attached to the pair of tabs to lock the top supporting member in place after adjustment.

6. The apparatus of claim 5 wherein the back support further includes a spring configured to press against the protrusions to lock the top supporting member in place after adjustment.

7. The apparatus of claim 6 wherein the first set of teeth and grooves and the second set of teeth and grooves define therein a cavity for allowing the pair of tabs to move between corresponding grooves.

8. The apparatus of claim 7 wherein the bottom supporting member includes a member for contacting an inner bottom surface of the back support to prevent the bottom supporting member from further displacement away from the back support.

9. The apparatus of claim 8 wherein the back support further includes an internal spring attached to the bottom supporting member, the spring for controlling the displacement of the bottom supporting member and to return the bottom supporting member to an original position upon removal of the electronic device.

10. The apparatus of claim 9 wherein:
the top supporting member is adjustably attached to the first side of the back support such that the top supporting member may be slid relative to the back support towards and away from the bottom supporting member; and
the bottom supporting member operates in conjunction with the top supporting member to hold the electronic device securely in place.

11. The apparatus of claim 1 wherein the first end of each of the first and second attachment arms comprises:
a curved receiver; and
a claw coupled to the curved receiver in a first position to form an enclosure about a portion of a headrest bar, the claw configured to be manipulated to a second position to open the enclosure to allow the portion of the headrest bar to be inserted or removed from the attachment arm.

12. The apparatus of claim 11 wherein each of the first and second attachment arms further comprises a control tab for manipulating the claw from the first position to the second position and vice versa.

13. The apparatus of claim 12 wherein each of the first and second attachment arms further comprises a spring attached to the control tab such that the spring is uncompressed in the first position and compressed in the second position, the spring configured to exert a force on the control tab for automatically manipulating the claw from the second position to the first position when the control tab is released.

14. The apparatus of claim 1 further comprising a first locking mechanism for locking the position of the first attachment arm and the second attachment arm, the locking mechanism including a rotatable knob, a screw and a locking portion, wherein the first attachment arm and the second attachment arm are both locked into position when the screw is received by the locking portion, and the screw defines the axis that the second end of the first attachment arm and the second end of the second attachment arm are both configured to pivot about.

15. The apparatus of claim 14 wherein:
the second end of the first attachment arm is positioned between the second end of the second attachment arm and the rotatable knob;
the second end of the second attachment arm is positioned between the first end of the neck and the second end of the first attachment arm;
the second end of the first attachment arm and the second end of the second attachment arm are both configured to pivot about the first end of the neck; and
the axis extends through the first end of the neck.

16. The apparatus of claim 15, wherein:
the first end of the first attachment arm is configured to pivot about the axis towards and away from the first end of the second attachment arm; and
the first end of the second attachment arm is configured to pivot about the axis towards and away from the first end of the first attachment arm.

17. The apparatus of claim 14 wherein the back support includes a socket for receiving the ball-shaped surface of the neck, and the apparatus further comprises a second locking mechanism for locking the ball-shaped surface of the neck to the back support at a user-set angle, the second locking mechanism including a fastener having threads, and wherein the socket includes complementary threads on an outer surface for receiving the threads of the fastener to lock the ball-shaped surface of the neck to the back support.

18. The apparatus of claim 1 wherein the neck is curved and decreases in girth moving from the first end of the neck to the second end of the neck.

19. An apparatus for securely holding an electronic device while the apparatus is attached to one or more headrest bars of a seat in a vehicle in a manner which allows the user to utilize the electronic device without holding the electronic device, the apparatus comprising:

- a first attachment arm having a first end and a second end, the first end configured to removably attach to the one or more headrest bars of the seat in the vehicle, the second end configured to pivot about an axis at the second end;
- a second attachment arm having a first end and a second end, the first end of the second attachment arm configured to removably attach to the one or more headrest bars of the seat in the vehicle, the second end of the second attachment arm being pivotally attached to the second end of the first attachment arm and configured to pivot about the axis;
- a neck having a first end and a second end, the first end of the neck attached to the second end of the first attachment arm and to the second end of the second attachment arm, the second end of the neck having a ball-shaped surface;
- a back support pivotably attached to the second end of the neck, the back support having an adhesive portion for contacting a non-screen side of the electronic device to hold the electronic device to the back support;
- a top supporting member adjustably attached to a first side of the back support such that the top supporting member may be slid relative to the back support towards and away from the back support, the top supporting member for pressing against a top edge of the electronic device; and
- a bottom supporting member adjustably attached to a second side of the back support opposite the first side such that the bottom supporting member may be slid relative to the back support towards and away from the top supporting member, the bottom supporting member for pressing against a bottom edge of the electronic device.

20. An apparatus for securely holding an electronic device while the apparatus is attached to one or more headrest bars of a headrest of a seat in a vehicle in a manner which allows the user to utilize the electronic device without holding the electronic device, the apparatus comprising:

- a first attachment arm having a first end and a second end, the first end configured to removably attach to the one or more headrest bars of the headrest of the seat in the vehicle, the second end configured to pivot about an axis at the second end;
- a second attachment arm having a first end and a second end, the first end of the second attachment arm configured to removably attach to the one or more headrest bars of the headrest of the seat in the vehicle, the second end of the second attachment arm being pivotally attached to the second end of the first attachment arm and configured to pivot about the axis;
- a neck having a first end and a second end, the first end of the neck attached to the second end of the first attachment arm and to the second end of the second attachment arm, the second end of the neck having a ball-shaped surface;
- a back support pivotably attached to the second end of the neck; and
- an adhesive portion attached to the back support for contacting a non-screen side of the electronic device to hold the electronic device to the back support.

\* \* \* \* \*